US005824257A

United States Patent [19]

Dashevsky et al.

[11] Patent Number: 5,824,257

[45] Date of Patent: Oct. 20, 1998

[54] MOLDING CORE CONSTRUCTION AND PROCESS FOR MOLDING OF HIGH-DENSITY ELECTRICAL CONNECTOR HOUSINGS

[75] Inventors: Vladimir A. Dashevsky, Batavia; Robert A. Owsley, Lisle; Gregory R. Pratt, Naperville; Kent E. Regnier, Lombard, all of Ill.

[73] Assignee: Molex Incorporated, Lisle, Ill.

[21] Appl. No.: 800,695

[22] Filed: Feb. 14, 1997

[51] Int. Cl.$^{6}$ .......................... B29C 45/36; B29C 45/44

[52] U.S. Cl. ........................ 264/328.1; 249/64; 249/151; 264/328.9; 425/577; 425/DIG. 58

[58] Field of Search ............................. 264/328.1, 318, 264/328.9, 272.11; 249/64, 151; 425/577, DIG. 10, DIG. 58, 416, 468

[56] References Cited

U.S. PATENT DOCUMENTS

| | | | |
|---|---|---|---|
| 2,017,216 | 10/1935 | Marcus | 425/577 |
| 3,559,249 | 2/1971 | Patton, Jr. | 264/328.9 |
| 4,187,272 | 2/1980 | Bourdon et al. | 264/318 |
| 4,711,752 | 12/1987 | Deacon et al. | 264/318 |
| 4,960,394 | 10/1990 | Marks et al. | 264/318 |
| 5,217,728 | 6/1993 | Grabbe | 425/577 |
| 5,470,522 | 11/1995 | Thome et al. | 425/577 |
| 5,587,189 | 12/1996 | Niimi | 425/DIG. 10 |

*Primary Examiner*—Jill L. Heitbrink

*Attorney, Agent, or Firm*—Charles S. Cohen

[57] ABSTRACT

An improved core detail tooling assembly for use in the injection molding of electrical connector housings utilizes opposing sets of tooling elements and one set of tooling elements positively engages the other set at a location exterior of openings in the mold cavity. This engagement location permits the molding of electrical connector housings with greater reliability and at smaller pitches.

18 Claims, 8 Drawing Sheets

MOLDING CORE CONSTRUCTION AND PROCESS FOR MOLDING OF HIGH-DENSITY ELECTRICAL CONNECTOR HOUSINGS

BACKGROUND OF THE INVENTION

The present invention relates generally to the manufacture of electrical connectors, and more particularly to the manufacture of high-density edge card connectors in which the connector housings thereof are made by molding processes, such as injection molding.

Circuit card connectors, also referred to in the art as "edge" card connectors, are used in many electronic applications to provide a connection between a primary circuit board, commonly referred to as a "mother" board and secondary circuit boards, commonly referred to as "daughter" boards. These daughter boards may be added to mother boards during the manufacture of an electronic devices, such as computers, or they may be added thereto after the initial manufacture thereof by either the user or a skilled electronics technician.

Edge card connectors are used to connect daughter boards to a mother board. Edge card connectors typically include an elongated housing formed from an insulative material and a plurality of conductive terminals. The connectors further commonly contain a central card-receiving slot that receives the edge of a secondary circuit card. The conductive terminals of the connector are arranged in rows within the slot on opposite sides thereof. These terminals contact a series of contact pads arranged along an edge of the secondary circuit card.

Space on mother boards in virtually all electronic devices, especially computers, is at a premium and with the popularity of smaller electronic devices, there is an ever-increasing demand for high-density electronic circuitry. Connectors that satisfy this demand utilize smaller terminals placed closer together to each other within the connector housing. In order to provide the desired high density, the housing portions that separate terminals are becoming increasingly thinner. The thinness of these portions presents a problem in the manufacture of the connectors.

The housings of electrical connectors are most easily manufactured by injection molding. In injection molding, molten plastic is injected under high pressure into the cavities of a mold. The cavity contains what is known as a core detail which cooperates with the walls of a mold to defines one or more complex, open shapes within the mold cavity. These open shapes are filled with molten plastic during injection. When the plastic solidifies, it forms a connector housing that is subsequently ejected from the mold.

Laminated tooling is typically used to form the core details for the molding of small connector housings. Laminated tooling utilizes a plurality of thin, individual metal plates that are stacked upon each other, or laminated together, to form the core detail. Such tooling may include two to three core detail tooling elements that interengage to form a core detail assembly for insertion into a cavity of a mold.

A common form of engagement between opposing sets of laminated tooling is a simple "wedge" type of engagement wherein opposing surfaces of core detail tooling elements abut each other. This wedge engagement is maintained by forcing the tooling elements against each other. In the molding of connector housings, it has been noted that even though this wedging action holds the tooling elements together, individual tooling elements may tend to deflect laterally (parallel to the longitudinal axis of the housing to be molded) or twist under the pressure of the advancing front of molten plastic as it enters the mold cavity.

Certain portions of the tooling elements are arranged in side-by-side order and spaced apart from each other to define intervening open spaces between them which form perimeter walls of terminal-receiving cavities of the finished connector housing. These transverse walls partially define cavities in the connector housing that receive conductive terminals. Deflection of just one tooling element from its intended position by the pressure of the injected plastic may result in either a twisted or deformed terminal-receiving cavity in the resulting molded connector housing. The effect of this deformation is that one or more of the terminal-receiving cavities of the connector housing will be twisted or warped. This deformation may interfere with, or altogether prevent, the insertion of conductive terminals therein, thereby rendering one or more corresponding circuits of the connector defective and useless for their intended purpose.

In order to counteract this pressure deflection problem, mold makers have adopted forms other than wedge engagement for core detail tooling. For example, mold makers have formed tongue-and-groove elements on opposing vertical or angled mating surfaces of core detail element in locations within the confines of the mold cavity. This type of engagement has alleviated some of the pressure deflection problem described above, but "flashing" occurs with this engagement.

Flash is the formation of very thin and irregular plastic deposits either on the finished connector, the core detail tooling itself or the surfaces of the mold cavity. In the former instance, the flash may present an impediment to insertion of conductive terminals into the connector because the flash occurs along parting lines that coincide with the mating engagement surfaces of the opposing core detail elements. In the latter instance, the flash provides interference with repeated engagement of the opposing tooling sets, thereby increasing the maintenance that must be performed on the core detail tooling to ensure repeated accurate molding of connectors. In known prior art tongue and groove type engagements, the parting line extends across the terminal-receiving cavities between opposing walls of the cavities in the connector housing, and hence flash that occurs along this parting line may interfere with the operation of the terminals within their respective cavities.

Inadvertent misalignment problems may occur during assembly of the core detail tooling elements if individual tooling elements are arranged in an incorrect order. With such misalignment, some of the tooling elements may project past the intended boundary of the tooling element assembly and breakage of the tooling elements may result should they be inserted into a mold and the two mold halves closed.

Accordingly, a need exists for laminated core detail constructions that avoid the aforementioned disadvantages and therefore, the present invention is directed to an improved connector construction which is particularly suitable and beneficial for molded, high-density electrical connectors.

It is therefore an object of the present invention to provide an improved core detail construction that resists the injection pressure of liquid plastic and that provides more accurate molding of high-density electrical connectors.

It is another object of the present invention to provide an improved laminated tooling core detail assembly and construction for use in the injection molding of small electrical connector housings, wherein the core detail tool elements engage each other at least at one location exterior of the openings formed in the mold cavity by the core detail tooling and wherein the parting line that occurs in the molded connector housing runs through the terminal-receiving cavity between opposing cavity sidewalls and preload walls, without interconnecting them together, thereby permitting the molding of connector housings with smaller pitches.

It is a further object of the present invention to provide a method for molding electrical connectors in which interlocking core detail elements are provided and engaged with each other in at least one area of the core detail elements that lie exterior of the mold cavity formed by the interengaged core detail elements and in the thicker portions of the core detail elements, and injecting molten plastic into the cavity after the engagement to form an electrical connector.

It is a still further object of the present invention to provide a method for molding electrical connector housings having a cleaner shutoff between opposing, interlocking core detail tooling elements by providing interengaging core detail tooling elements detail portions of different thicknesses.

It is still another object of the present invention to provide a method for manufacturing electrical connectors, particularly connectors utilized in high-density circuit applications, the method including the steps of providing laminated core detail tooling, the tooling including at least two interengaging core detail members; engaging the two core detail members to provide a core detail, the engagement of the core detail members occurring exterior of the cavity portions of the mold and exterior of the finished part so as to provide a parting line that extends generally parallel to the terminal preload walls formed in the connector housing; injecting a liquified molding material into the core of the mold; letting the material solidify to form a finished connector; and, ejecting the connector from the mold.

SUMMARY OF THE INVENTION

The present invention provides an improved process for manufacturing electrical connectors, wherein the connector cavities that receive conductive terminals are less susceptible to twisting or bending during the molding of the connectors, thereby permitting more reliable methods of manufacturing high density circuit connectors.

In this regard, an improved laminated core detail construction that includes opposing, interengaging core tooling elements is provided. Each core tooling element has respective base portions and detail portions extending therefrom, the base portions being thicker than the detail portions. Recesses are formed in at least the base portions of one core tooling element and they receive opposing engagement ends of the detail portions of other core tooling elements.

The engagement ends are received within the greater thickness base portions in an area of the mold cavity that lies exterior to the terminal-receiving cavities formed in the molded connector housing. The increased thickness of the base portions that surround these recesses contributes to a strong, interlocking between opposing core tooling elements outside of the perimeter of the connector housing in the mold cavity that eliminates twisting of deformation from occurring in the core tooling elements, thereby resulting in stronger and thinner terminal-receiving cavity walls.

The parting lines that occur in the terminal-receiving cavities of connector housings produced by the methods of the present invention lie between the connector housing sidewalls and preload walls and do not trace a path in the terminal-receiving cavities that interconnects the housing sidewalls and preload walls as in the prior art, thereby moving the location of any flash that will occur away from the connector terminals.

In the molding of connectors utilizing the processes of the present invention and the laminated core construction, the core members are interlocked together to form a core detail assembly that is inserted into the mold cavity. Molten plastic is injected into the mold cavity through the open passages of the core detail. The melt solidifies to form a molded connector housing which is then ejected from the mold cavity. Conductive terminals are inserted into the terminal-receiving openings formed in the housing to complete the connector. The engagement of the opposing core members outside of the mold cavity permits the terminal-receiving cavities formed in the resulting connector to be spaced more closely together without affecting the overall structural integrity of the connector housing and thereby reduce the pitch of such connectors down to an order of between about 1 mm and about 0.5 mm.

A difference in thicknesses of the interengaging core detail portions adds a stepped configuration to the upper portions of the terminal-receiving cavities and a relocation of the engagement surfaces between the core detail portions results in the formation of a parting line in finished connector housings molded in accordance with the present invention that occurs entirely between the connector housing sidewalls and preload walls and extends upwardly through the upper portions of the terminal-receiving cavities rather than interconnecting them as in the prior art.

These and other objects, features and advantages of the present invention will be apparent through a reading of the following detailed description, taken in conjunction with the accompanying drawings, wherein like reference numerals refer to like parts.

BRIEF DESCRIPTION OF THE DRAWINGS

In the course of this description, reference will be frequently made to the attached drawings in which.

DETAILED DESCRIPTION OF THE PREFERRED EMBODIMENTS

Figure 1:
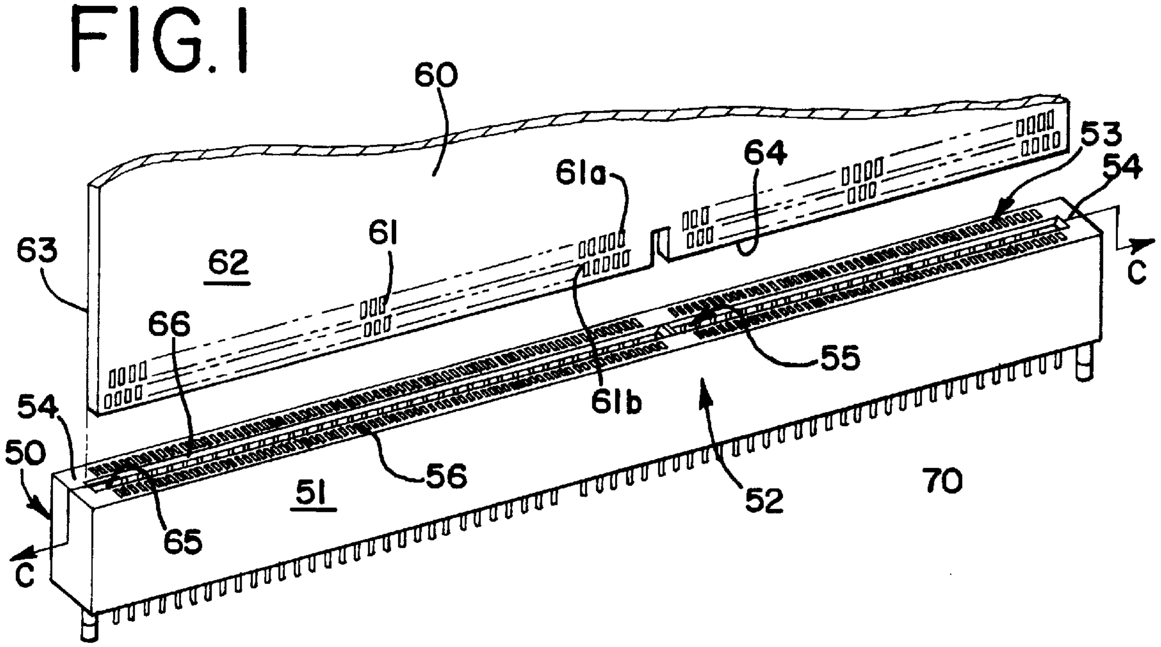
FIG. 1 is a perspective view of an electrical connector for which the present invention is used to manufacture with a molded connector housing positioned therein.

FIG. 1 illustrates a known edge card connector 50 having a housing 51 formed from an electrically insulative material, such as a plastic. The housing 51 has two opposing sidewalls 52, 53 that are interconnected by endwalls 54 to form the rectangular housing. The housing 51 includes a central slot 55 that longitudinally extends between its sidewalls 52, 53 and is dimensioned to receive a circuit card 60 therein. The circuit card 60 is commonly referred to in the art as an "edge" card in that it has a plurality of contact pads 61 disposed on opposing surfaces 62, 63 in rows along a lower engagement edge 64 thereof.

Figure 14:
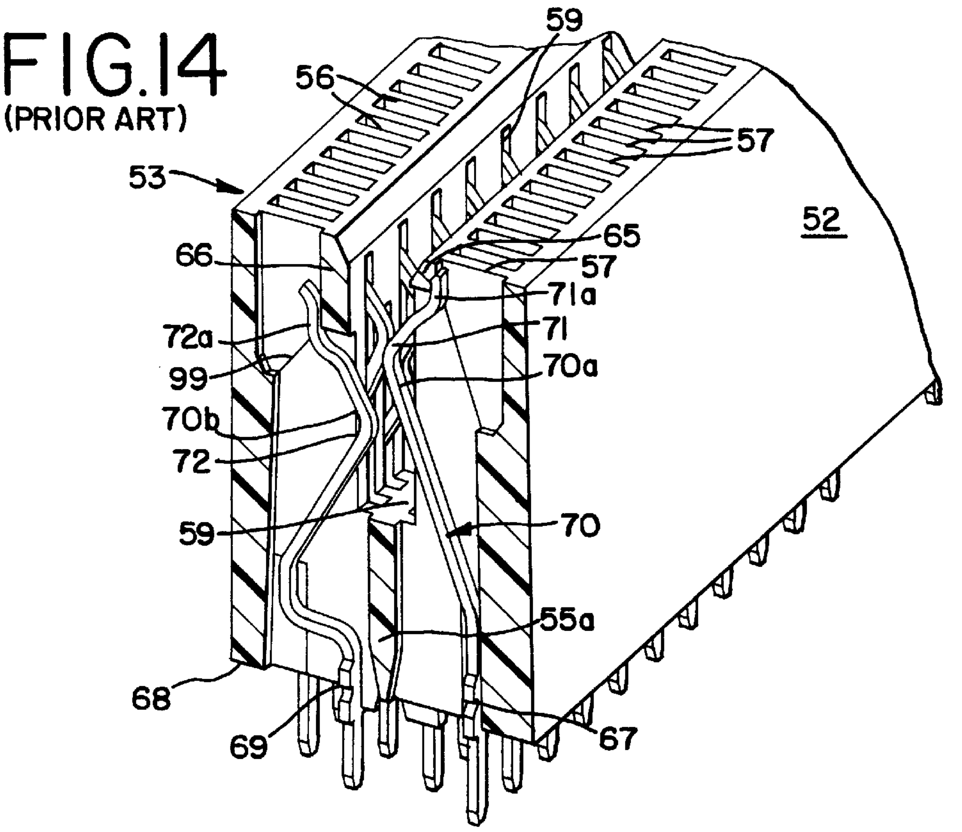
FIG. 14 is an enlarged detail perspective view, partially in section of the prior art electrical connector housing of FIG. 10 with a plurality of conductive terminals inserted therein.

The connector housing 51 further includes a plurality of cavities 56 (FIGS. 1 & 10) formed on opposite sides of a centerline C of the connector housing 51 between the opposing sidewalls 52, 53 and that receive electrically conductive terminals 70 therein. The connector terminal-receiving cavities 56 are arranged within the connector housing 51 in opposing order to the contact pads 61 disposed along the circuit card engagement edge 64. (FIG. 14.) The connector 50 illustrated is known in the art as a "bi-level" connector, meaning that the terminals 70 of the connector make contact with two rows 61*a*, 61*b* of contact pads 61 of the edge card 60 at different levels thereon.

In this regard, and as illustrated in FIG. 14, the prior art connector 50 has its terminals separated into two, alternating, different sets of conductive terminals 70*a*, 70*b*, each having card contact portions connected to spring arms 71, 72 disposed at different elevations thereon and within the connector card-receiving slot 55 in order to electrically contact different contact pads 61 of the two rows 61*a*, 61*b* of contact pads 61 disposed on the edge card 60.

The terminal-receiving cavities 56 of the connector housing 51 extend vertically within the connector housing 51 and are arranged lengthwise along the axis of the connector 50 separated by intervening transverse walls 57. (FIG. 14.) The terminal-receiving cavities 56 are open at the top 58 of the connector housing and also partially open to the card-receiving slot 55 of the connector housing 51 through vertical openings 59. The bottom of the slot 55 may be defined by a longitudinal base wall, or rib 55*a*, which the circuit card edge 64 may abut when the card 60 is fully inserted into the card-receiving slot 55. Extending generally parallel to this rib 55*a* are two walls 65, 66 generally adjacent the top 58 of the terminal-receiving cavity 56 and disposed on opposite sides of the slot base wall 55*a*. As can be seen from FIG. 14, these preload walls 65, 66 serve to apply a preload to the terminals 70 held in the cavities 56 by engaging the preloading portions 71*a*, 72*a* of the connector terminals 70*a*, 70*b*.

The preload walls 65, 66 alternate on opposite sides of the base wall 55*a* for the length of the connector housing 51. One preload wall 66 may be considered a "low" preload wall inasmuch as it engages the preloading portion 72*a* of its associated terminal 70*b* at an elevation lower than the elevation of the "high" preload wall 65 that engages the preloading portion 71*a* of its associated terminal 70*a* in the corresponding cavity 56 disposed across the card-receiving slot 55.

Figure 10:
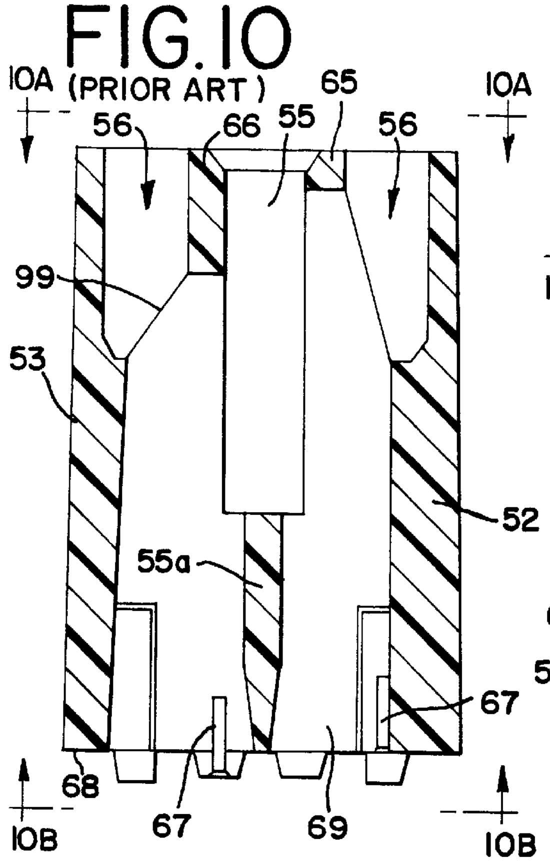
FIG. 10 is a cross-sectional view of a conventional electrical connector housing similar to the connector of FIG. 1 that is formed using the core tooling of FIGS. 2–4.
Figure 10A:
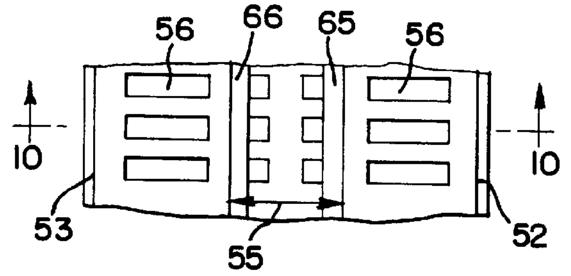
FIG. 10A is a top plan view of the connector housing of FIG. 10 taken generally along lines A—A thereof.
Figure 10B:
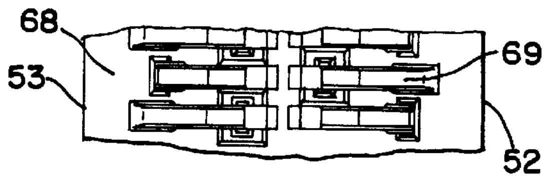
FIG. 10B is a bottom plan view of the connector housing of FIG. 10 taken generally along lines B—B thereof.

The terminal-receiving cavities further include one or more recesses 67 formed therein that engage terminal-retention portions of the terminals 70. (FIGS. 10 & 14.) At the bottom 68 of the connector housing are lower housing openings 69 that extend through the bottom 68 of the connector housing 51 and communicate with the exterior of the connector housing 51.

Figure 2:
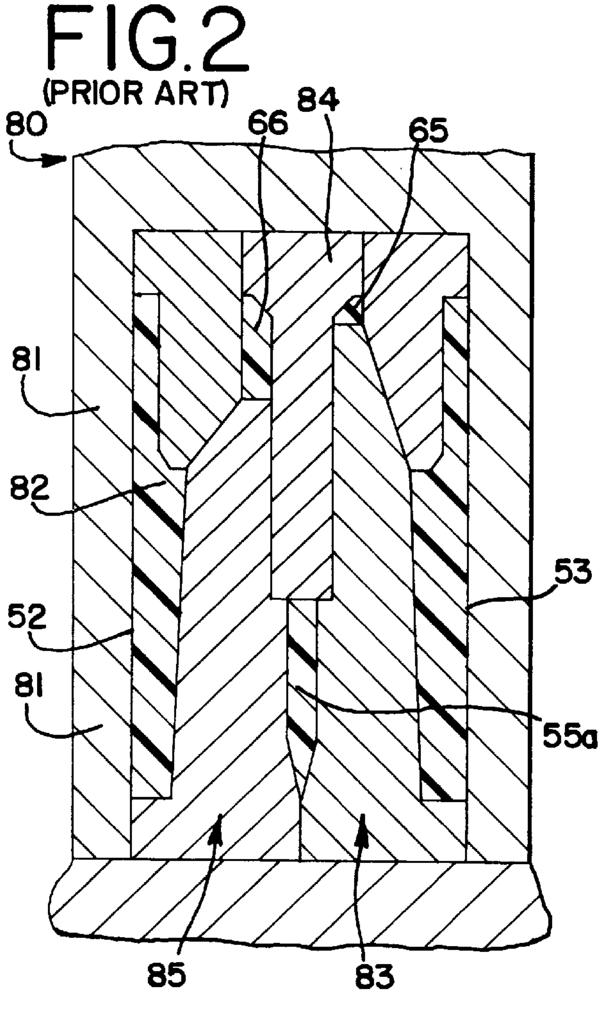
FIG. 2 is a sectional view of a known mold used to manufacture the electrical connector of FIG. 1.

The housings 51 of the connector 50 of FIG. 1 are typically formed by an injection molding process in which molten, liquified plastic is injected under high pressure into a cavity in a mold. A typical mold 80 is illustrated in FIG. 2 in cross-section to show the arrangement of a core detail assembly 83 in place within the mold 80 and plastic occupying the openings defined in the mold cavity. The representative mold 80 of FIG. 2 is formed by one or more mold blocks 81 that meet together to form an internal mold cavity 82 therein, i.e., the area enclosed by the dark line in FIG. 2. A core detail assembly 83 is insertable into the mold cavity 82 and includes opposing sets 84, 85 of laminated core tooling elements, with the one set 84 including a single core detail elements 84 and the other set 85 including two elements 85*a*, 85*b*. The tooling elements 84, 85 engage each other to form solid portions and open areas within the mold cavity 82. As is known in the art, the solid portions of the tooling elements 84, 85 form open spaces in the finished connector housing 51, such as the terminal-receiving cavities 56, while the open spaces formed in the mold cavity 82 will fill with plastic and form the connector housing sidewalls 52, 53, the base rib 55*a* and the preload walls 65, 66.

Figure 3:
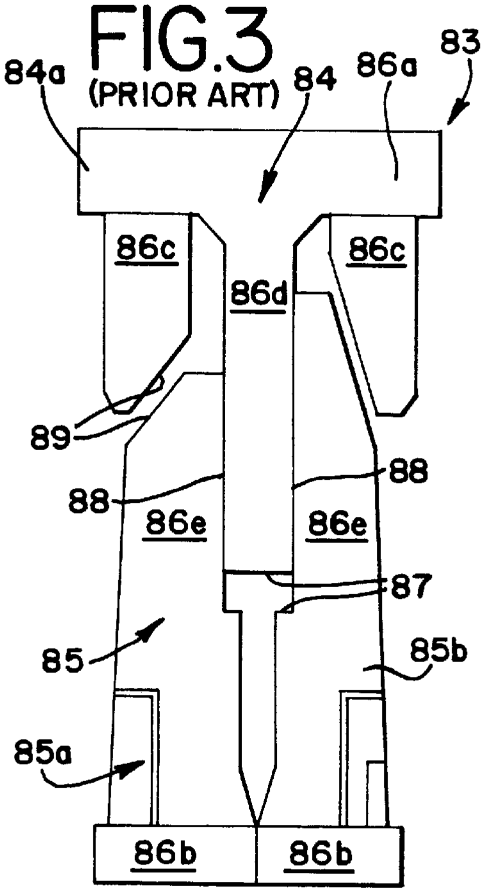
FIG. 3 is an elevational view of known laminated tooling used to construct a known core detail used with the mold of FIG. 2, illustrating opposing first and second sets of core tooling in spaced-apart order.
Figure 5:
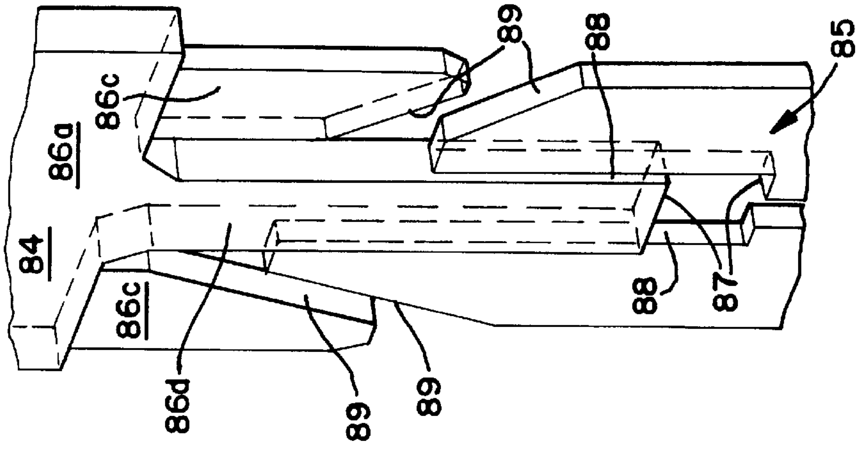
FIG. 5 is an enlarged detail perspective view of the first and second sets of core tooling elements spaced apart from each other to illustrate the surfaces of the core tooling elements that engage each other to produce a "classic" parting line in the manufacture of electrical connectors.

In FIG. 3, the tooling elements of each set 84, 85 are shown as having base portions 86*a*, 86*b* and detail portions 86*c*, 86*d* & 86*e* that extend therefrom. The base portions 86*a*, 86*b*, in essence, define the tops and bottoms of the mold cavity 82 and the connector housing 51 formed therein, while the detail portions 86*c–e* form the interior details of the connector housing 51. As mentioned above, the detail portions 86*c–e* cooperate with the mold blocks 81 shown to define openings that form the connector housing sidewalls when filled with plastic. They also cooperate with each other to form the terminal-receiving cavities 56 of the connector 50 by being spaced apart from each other longitudinally within the mold 80 (into the plane of the paper of FIG. 2). Adjacent tooling elements 84, 85 abut each other at their respective base portions 86*a* & 86*b* which are thicker than the remaining portions of the tooling elements so as to create intervening spaces (not shown) between adjacent pairs of tooling elements 84, 85 lengthwise through the mold 80 that fill with plastic during molding and form the intervening transverse walls 57 of the connector housing 51. The detail portion 86*c–e* of the tooling elements 84, 85 are thinner than the base portions 86*a–b*, with typical thicknesses being on the order of about 0.039 inches for the base portions 86*a–b* and about 0.022 to about 0.024 inches for the detail portions 86*c–e*. The upper tooling element 84 may be formed in a single piece as shown in FIGS. 3–5, or it may include three separate pieces as shown in FIG. 2.

As seen in FIGS. 2 & 3, the tooling elements 84, 85 include opposing engagement surfaces 87, 88 & 89 that are pushed against each other to hold the tooling element sets together 84, 85. These engagement surfaces shown include one lower horizontal engagement surface 87, two vertical engagement surfaces 88 and two angled engagement surfaces 89. FIG. 3 illustrates the tooling elements 84, 85 slightly separated to expose their respective engagement surfaces, while FIG. 4 illustrates the tooling elements 84, 85 engaged together. FIG. 5 is a perspective view of the core detail assembly 83 of FIG. 3 taken from a reverse angle with portions of the engagement surfaces 87–89 shown in phantom for clarity.

Figure 4:
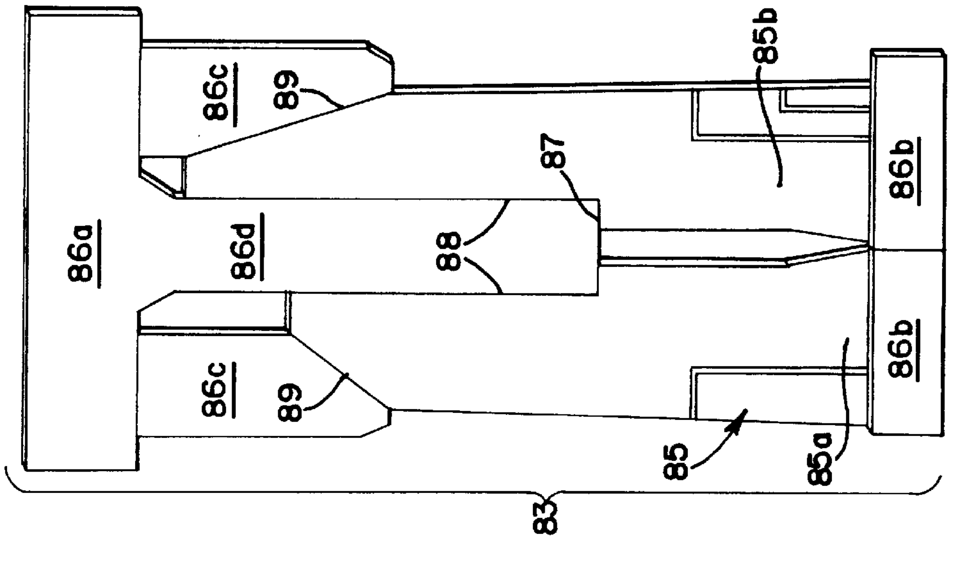
FIG. 4 is an elevational view of the core detail tooling of FIG. 3 illustrating the first and second core tooling members in an engaged position, such as would occupy the cavity of the mold of FIG. 2.

As shown best in FIG. 4, the three engagement surfaces 86–88 abut each other when the tooling elements 84, 85 are brought together. These surfaces may have a draft or taper of about 0.50° applied thereto in order to provide a slight taper to prevent galling due to repeated contact during repeated molding cycles. When brought together, the engagement surfaces 86–88 of the opposing core detail elements 84, 85 are wedged together so that the engagement surfaces bear against each other. In reduced pitch connectors, in order to reduce the pitch P, or spacing, between adjacent tooling elements, the detail portions, particularly detail portions 86*c* and 86*e* must be made of extremely thin metal.

As explained above, this wedge-type of engagement presents problems with the finished connectors because it has been noted that during injection, the pressure of the advancing front of plastic entering the mold cavity 82 may cause the thinner detail portions 86*c–e* of the core tooling elements 84, 85 to deflect or twist. This deformation results in twisting, or warping, of the connector housing transverse walls 57 and of the preload walls 65, 66 (FIG. 10), thereby deforming the terminal-receiving cavities 56. Warped cavities 56 often preclude the insertion of terminals 70 therein, resulting in defective connectors.

Figure 6:
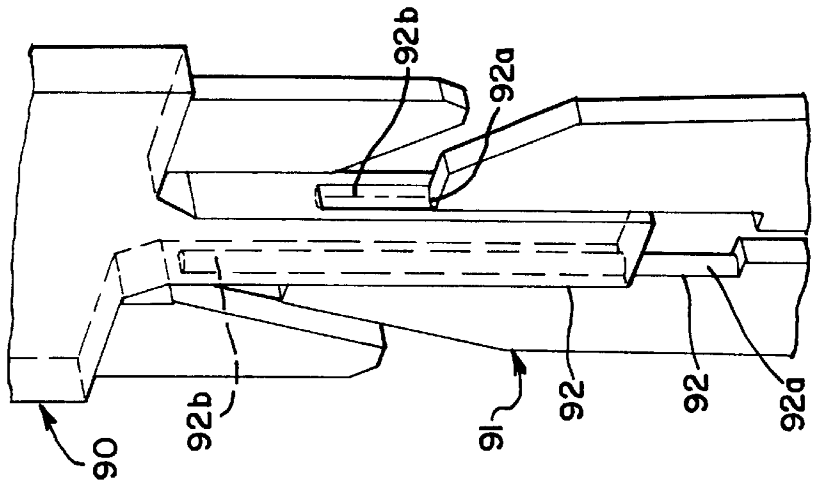
FIG. 6 is an enlarged detail perspective view of another known manner of core tooling construction in which the core tooling elements engage each other to produce a second classic parting line in the manufacture of electrical connectors.

One known attempt to correct this pressure-induced problem is depicted in the opposing pairs of core detail tooling elements 90, 91 of FIG. 6, wherein the vertical engagement surfaces 92 of the elements 90, 91 have respective interengaging tongue portions 92*a* and groove portions 92*b* formed thereon. These tongue and groove portions 92*a*, 92*b* provide a more positive engagement between the core elements 90, 91 than the wedging type engagement of the construction of FIG. 4. However, the problem of flash still occurs in this type of construction. Flash is a very thin plastic deposit that occurs on either the tooling engagement surfaces or the finished connector housing, or both. The flash on the connector housing 51 will typically occur along the interface where the engagement surfaces meet, known as a parting line, while flash on the tooling elements 90, 91 will occur on the mating surfaces.

Figure 8:
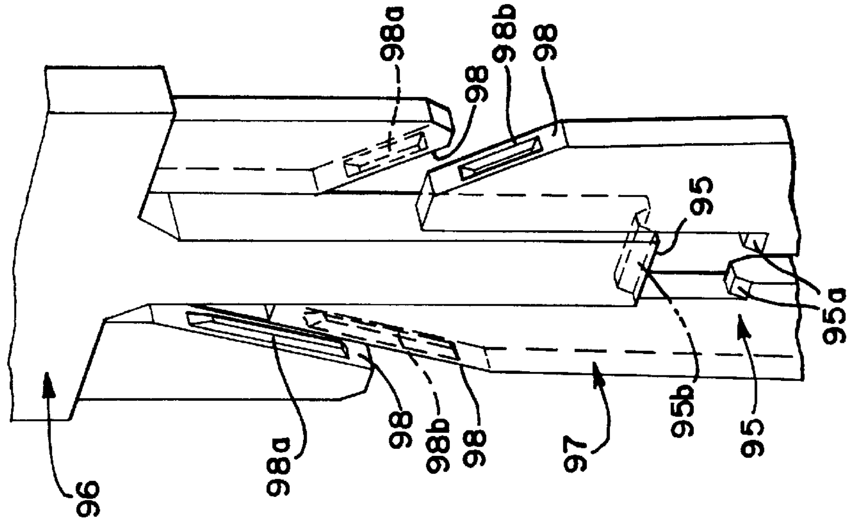
FIG. 8 is an enlarged detail perspective view of another known manner of core tooling construction in which the core tooling elements that engage each other to produce yet a fourth classic parting line in the manufacture of electrical connectors.
Figure 7:
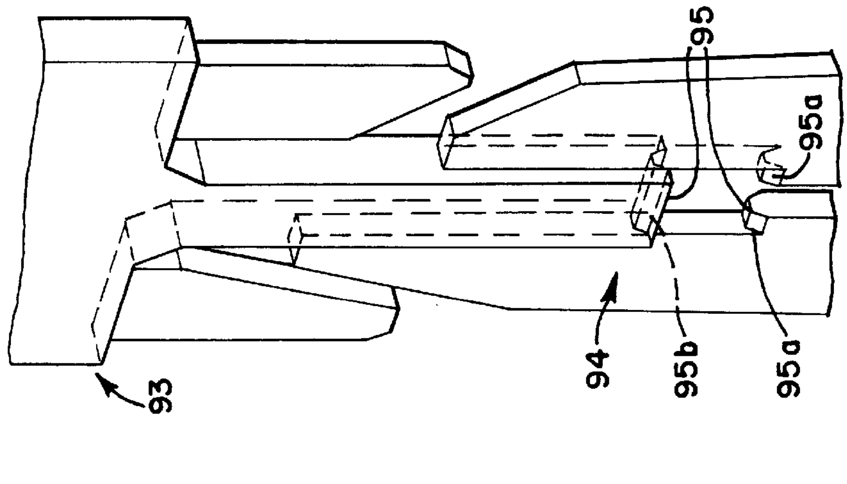
FIG. 7 is an enlarged detail perspective view of another known manner of core tooling construction in which the core tooling elements engage each other to produce a third classic parting line in the manufacture of electrical connectors.

FIG. 7 illustrates another known tooling element construction that attempts to overcome the pressure-induced problems associated with wedge-type engagement. In this construction, the opposing core detail tooling elements 93, 94 have respective tongue and groove elements 95*a*, 95*b* that are located at lower, horizontal opposing engagement surfaces 95. FIG. 8 illustrates yet another tooling element construction where core detail tooling elements 96, 97 include tongue and groove portions 95*a*, 95*b* & 98*a*, 98*b* disposed on both lower horizontal engagement surfaces 95 and opposing angled engagement surfaces 98 of opposing tooling elements.

All of the known core detail tooling constructions of FIGS. 5–8 result in the formation of a parting line 99 in the connector housing 51 as illustrated in FIGS. 10 & 14 that is coincident with the angled engagement surfaces of the core detail tooling assemblies of FIGS. 3–8. In this detailed description, this parting line 99 is referred to as a “classic” parting line because it interconnects the connector housing sidewalls 52, 53 with their associated, opposing preload walls 65, 66, i.e., in FIG. 10 the parting line 99 is shown as tracing a path that extends from the angled corner 65*a*, 66*a* of each preload wall 65, 66 across the terminal-receiving cavity 56 to the interior face of the connector housing sidewalls 52, 53, respectively.

The path that the parting line 99 traces can be seen in FIGS. 2, 10 & 14 to intersect with the path of the terminal ends, or preloading portions 71*a*, 71*b* that engage the shoulders of the preload walls 65, 66. Flash has been found to occur along this parting line in the finished connector housing, and when it does, the flash may interfere with the movement of the terminals 70 back from their contact with the preload walls 65, 66 (FIG. 14) within the terminal-receiving cavities 56 when a circuit card 60 is inserted into the card-receiving slot 55. Similarly, flash that occurs within the mold on the engagement surfaces of the core detail tooling elements may increase the amount of time and effort required to maintain the tooling in proper molding condition.

The present invention is directed to an improved core detail construction and methods of molding electrical connectors using such tooling to produce consistent and reliable high-density electrical connector housings, while eliminating molding deformation problems and mold maintenance.

Figure 9:
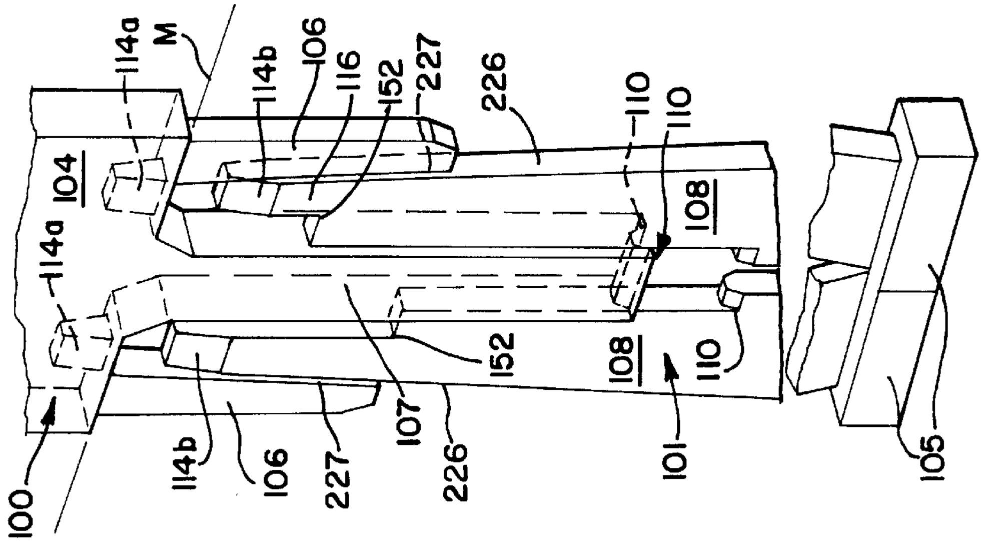
FIG. 9 is an enlarged detail perspective view of a core tooling element construction constructed in accordance with the principles of the present invention, spaced apart from each other and illustrating the manner of engagement therebetween to produce a new, "modified" parting line in the manufacture of electrical connectors.
Figure 12:
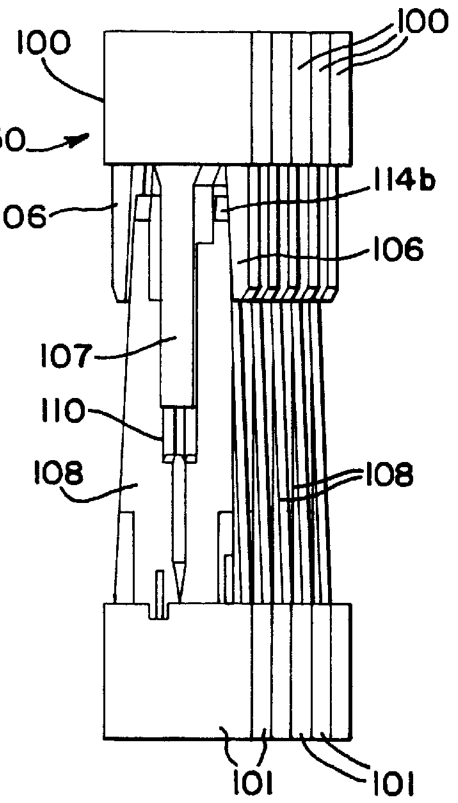
FIG. 12 is a perspective view of a new laminated tooling assembly use to form the core detail for the molding of the connector of FIG. 11.

FIG. 9 illustrates two improved core detail tooling elements 100, 101 formed in accordance with the principles of the present invention. The core detail tooling elements 100, 101 are preferably formed from a durable metal, such as steel, that is used to make a laminated core detail tooling assembly 150 (FIG. 12) which is inserted into a mold cavity. The laminated tooling assembly 150 and the interior walls of the mold cavity cooperate together to form the complex openings in the mold cavity that are filed with molten plastic by injection. As shown in FIG. 12, the tooling assembly 150 is modular in nature, in that additional tooling elements 100, 101 may be added to the assembly to increase its length to thereby permit the molding of virtually any length connector housing.

The points of engagement between the core detail elements 100, 101 of the present invention occur along lower horizontal engagement surfaces 110 (FIGS. 9 & 17) (utilizing tongue 110*a* and groove 110*b* elements similar to those shown in FIGS. 7 & 8) and along the thicker base portions 104 of the upper tooling elements 100. This latter type of engagement utilizes recesses 114*a* formed in the base portions 104 of the upper tooling elements 100 that receive two opposing engagement tips, or ends 114*b*, formed on the upper ends 116 of the lower tooling element detail portions 108. Importantly, this latter engagement occurs outside of the mold cavity confines, as illustrated by the line M in FIG. 9. Inasmuch as the center detail portion 107 of the upper tooling element 100 is preferably of the same thickness as the base portion 104 thereof, both the upper and lower interlocks of the tooling elements 100, 101 will occur in the thicker portions of the tooling elements, thereby virtually eliminating the likelihood of any twisting or warping of the tooling elements under the pressure of the injected plastic.

Preferred results have been obtained using an upper tooling element 100 with a base portion 104 and center detail portion 107 having thicknesses of about 0.039 inches and side detail portions 106 having a thickness of about 0.024 inches, and a lower tooling element 101 having detail portions with a thickness of about 0.022 inches. The difference in thicknesses between the core detail portions also provides for a cleaner and simpler mold cavity shutoff between the core detail portions.

Figure 11:
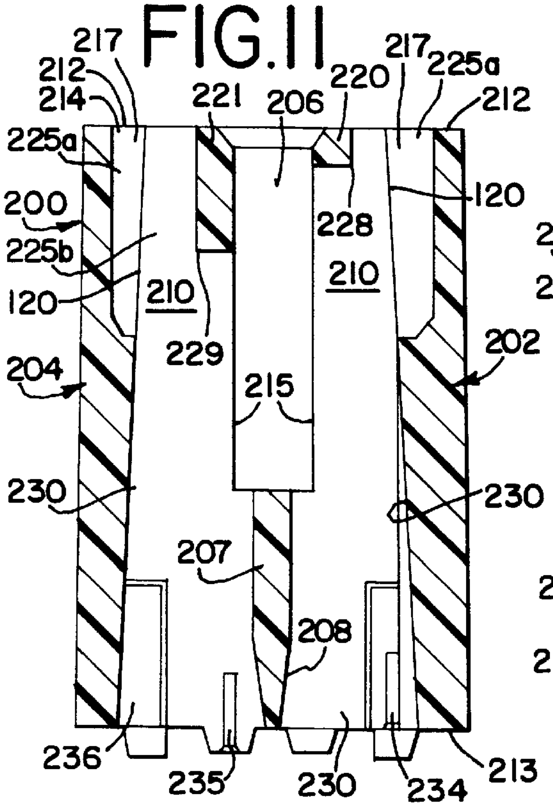
FIG. 11 is a cross-sectional view of a new electrical connector housing used with an edge card connector constructed in accordance with the principles of the present invention by molding with the core tooling of FIG. 9.
Figure 15:
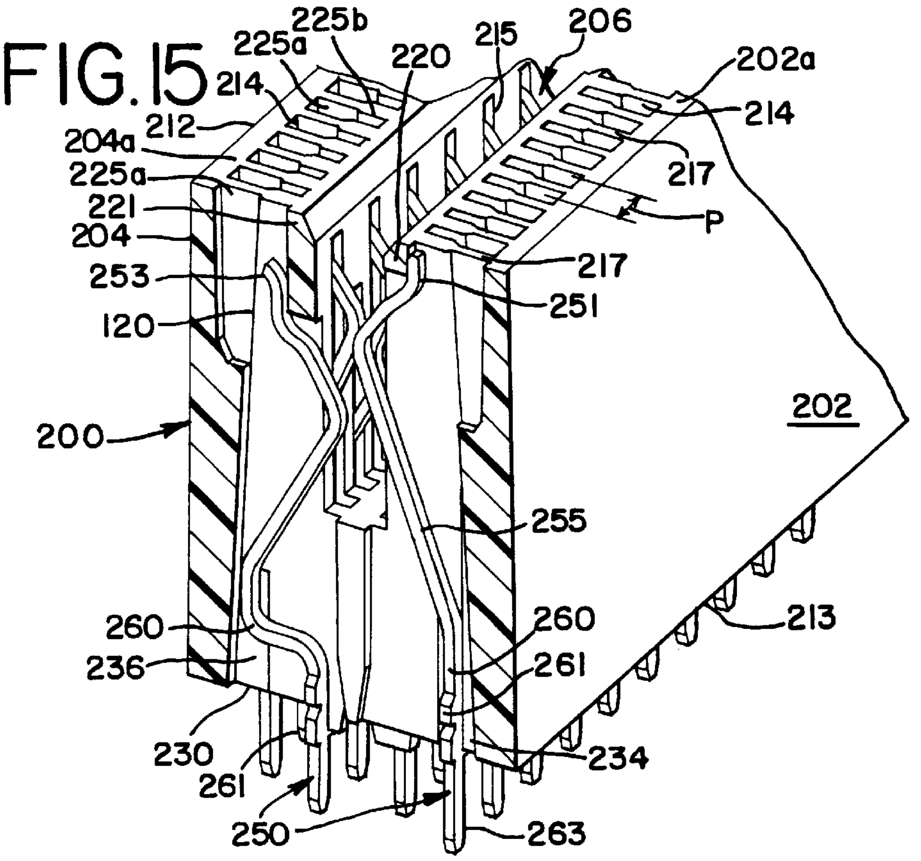
FIG. 15 is an enlarged detail perspective view, partially in section of an edge card connector constructed in accordance with the principles of the present invention using the connector housing of FIG. 11 and showing the placement of conductive terminals therein.

Focusing now on FIGS. 11 & 15, a connector housing formed in accordance with the principles of the present invention is shown generally at 200. The connector housing 200 is rectangular in shape (FIG. 15) and has two sidewalls 202, 204 that extend the length of the connector and are spaced apart from each other and include a central circuit card-receiving slot 206 therebetween.

A series of terminal-receiving cavities 210 are formed between the sidewalls 202, 204 that extend between the top 212 and bottom 213 of the connector housing 200. The cavities 210 are separated by intervening transverse walls 217 and the terminal-receiving cavities 210 open both to the top 212 and the interior of the card-receiving slot 206 (FIG. 15) by way of respective, distinct openings 214, 215. The top openings 214 are defined by the sidewalls 202, 204, the transverse walls 217, the interior portions 202*a*, 204*a* of the connector housing and respective terminal preload walls 220, 221 that extend across the terminal-receiving cavities 210.

Preload walls 220, 221 are located in each cavity and therefore separate the top openings 214 of the cavities 210 from the card slot 206 and the vertical openings 216 that communicate with card slot 206. The preload walls 220, 221 of the two opposing cavities have different relative heights, i.e., one preload wall 220 being "high" and the other preload wall 221 being "low" in order to accommodate the different relative heights of the terminal preload wall engagement portions 251, 253 received within the cavities 210. In addition, the preload walls alternate so that a low wall is opposite a high wall and between a pair of high walls, and vice versa.

By moving the point of upper engagement between the tooling elements 100, 101 (FIG. 9) upwards and generally exterior of the mold cavity confines, the angled engagement surfaces 88 (FIGS. 3–5) and 98 (FIG. 8) that extend across the terminal-receiving cavities 56 between the housing sidewalls 52, 53 and preload walls 65, 66 of the prior art connectors 50 (FIGS. 1, 2, 10 & 14) are eliminated and a more positive interlock is obtained between the tooling elements 100, 101 than by wedging. This relocation of the interlock additionally permits the formation of the connector housing preload walls 220, 221 by utilizing notches 152 formed in each individual lower tooling element detail portion 108, rather than by the engagement of the angled mating surfaces 89 of the two tooling elements together at 88 and 98 in the prior art constructions of FIGS. 3 & 8.

Figure 11A:
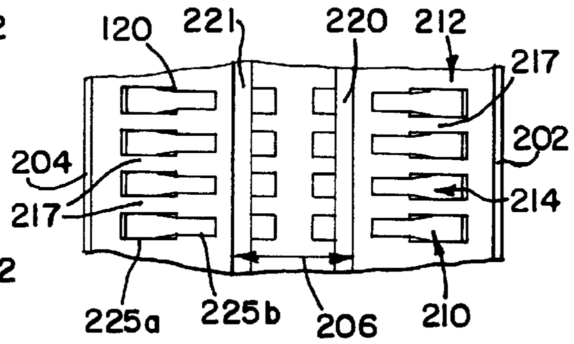
FIG. 11A is a top plan view of the connector housing of FIG. 11 taken generally along lines A—A thereof.
Figure 11B:
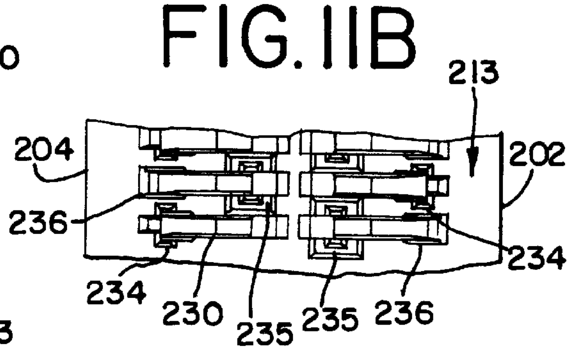
FIG. 11B is a bottom plan view of the connector housing of FIG. 11 taken generally along lines B—B thereof.

Still further, this relocation allows the detail portions 106 of the upper core tooling elements 100 to be made thicker or wider than their adjoining lower core detail tooling element detail portions 108 so that the cavities 210 are formed with two adjacent cavity sections 225*a*, 225*b* and the top openings 214 may have a stepped, or bifurcated, configuration when viewed from the top of the connector housing 200. This stepped configuration has an overall T-shape in FIG. 11A, with the rear sections 225*a* of the cavities 210 being wider than the front sections 225*b*.

The core detail tooling element construction of the present invention also permits the reliable, repeated molding of reduced pitch connector housings in which the transverse walls 217 separating adjacent terminal-receiving cavities 210 are structurally sound because of the engagement of the tooling elements 100, 101 that occurs exterior of the part openings in the mold cavity. Thus, the transverse walls 217 and preload walls 220, 221 are formed in a manner which significantly reduces any molding deformation thereof and of the terminal-receiving cavities 210 which they cooperatively form.

Figure 16B:
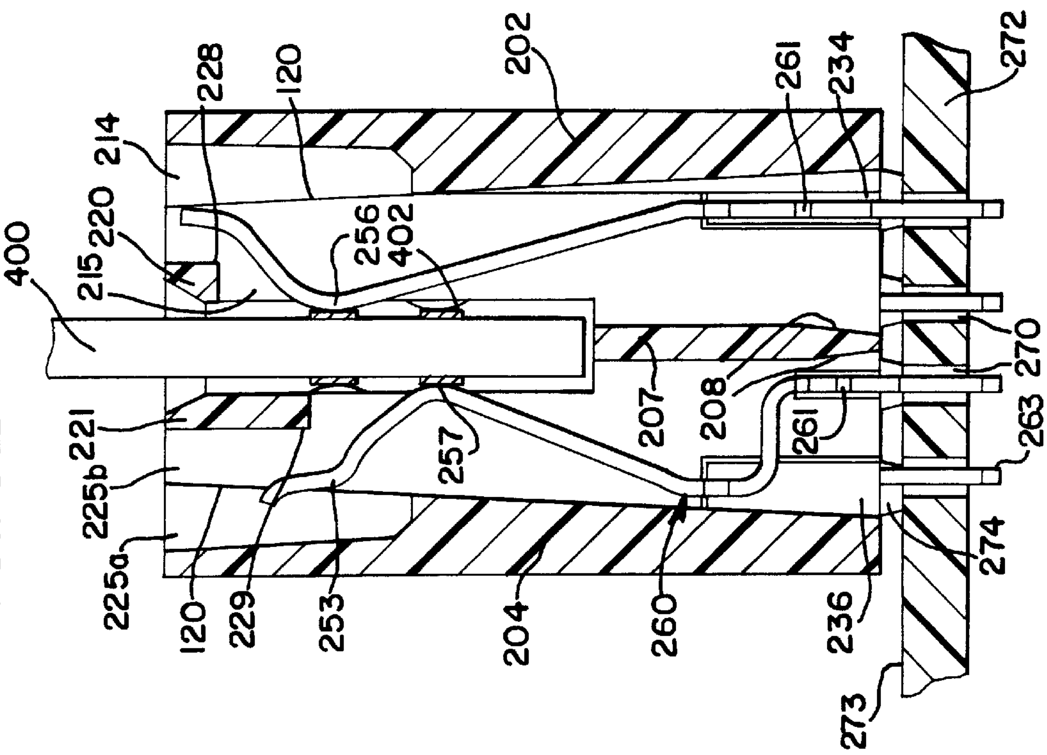
FIG. 16B is the same view as FIG. 16A, but showing the edge card fully inserted into the connector card-receiving slot.
Figure 16A:
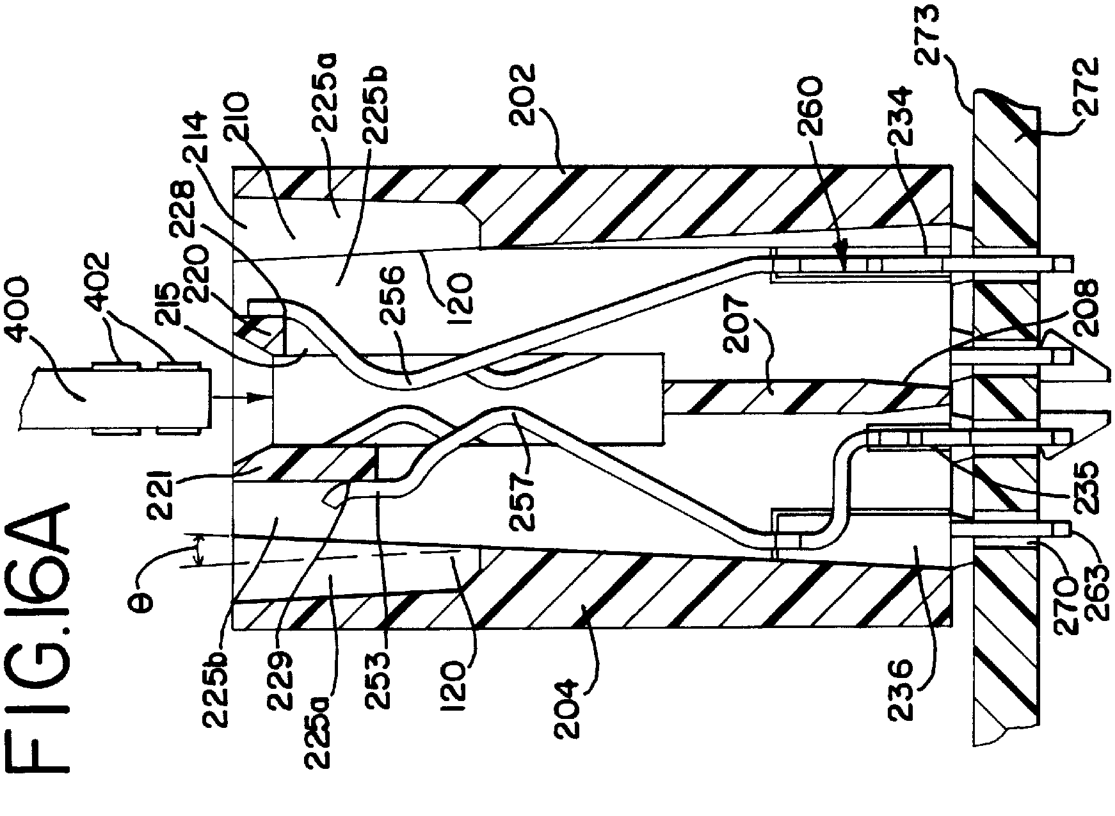
FIG. 16A is an enlarged detailed sectional view similar to FIG. 11, illustrating the connector of FIG. 15 in position ready to receive an edge card within its card-receiving slot.

The preload walls 220, 221 are formed between only two of the core detail tooling elements 106 and 107, rather than the three elements 86*c*–*e* of the prior art as illustrated in FIG. 3. This structure changes the location, or path, of the parting line 120 from that known in the art and eliminates it from interconnecting the housing preload walls 220, 221 and the sidewalls 202, 204. As a result, any deformation or flash at the parting line 120 is less likely to interfere with the terminals 250 in the terminal-receiving cavities 210. Rather, as illustrated in FIGS. 11 & 15, the parting line 120 is now formed along the almost vertical engagement surfaces 226, 277 of the tooling element detail portion 106, 108 so that the parting line 120 now extends upwardly within the terminal-receiving cavities 210 and is spaced away from the preload walls 220, 221. These engagement surfaces 226,227 are disposed at a slight angle θ from the vertical, as shown in FIG. 16A. Thus, if flash does occur at the parting line 120, it is less likely to interfere with the operation of the terminals 250 in their cavities 210 during insertion and removal of an edge card 400 into the card-receiving slot 206. (FIG. 16B).

Figure 13:
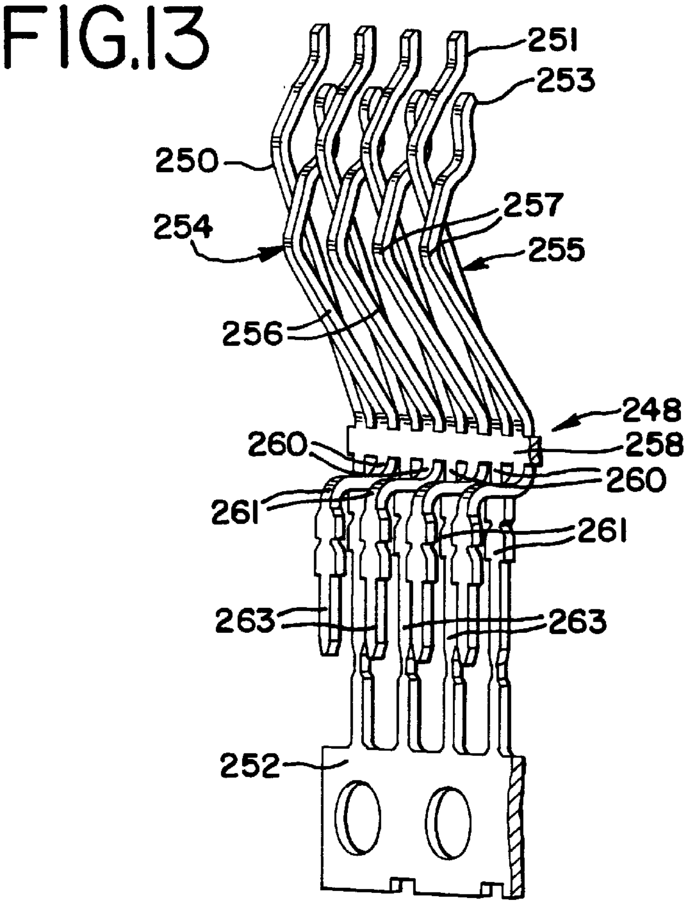
FIG. 13 is a perspective view of a conductive terminal assembly used in forming electrically conductive terminals used in the connector housing of FIG. 11.

Turning now to FIG. 13, a terminal assembly is illustrated generally at 248 having a plurality of individual, electrically conductive terminals 250 attached to a carrier strip 252. The terminal assembly 248 is shown in a form prior to separation of the individual terminals 250 therefrom and insertion of them into a connector housing. The terminals 250 shown on the assembly 248 are "bi-level" terminals and in this regard, the assembly 248 includes first and second terminals 254, 255 arranged in alternating order along the length of the carrier strip 252. Each of the first and second terminals 254, 255 includes contact portions in the form of resilient spring arms 256, 257, intermediate portions 258, base portions 260 that extend generally oppositely from the intermediate portions 258 and rest portions 251, 253 that engage and rest against the preload walls 220, 221. The spring arms 256, 257 extend out at an angle from the intermediate portions 258 into the card-receiving slot 206 at a predetermined angle. The spring arms 256, 257 may be positioned at different elevations or levels within the card-receiving slot 206, as shown, or they may be positioned at the same level within the slot 206. The spring arms 256, 257 may also be coined at the points of engagement with the contact pads 402 of an edge card 400 inserted into the card-receiving slot 206. (FIG. 16B.)

The base portions 260 of the terminals preferably further include distinct connector housing engagement, or retention portions 261, that are shown as having one or more projecting barbs 262 extending out from the sides thereof that will engage portions of the terminal-receiving cavities 210. Solder tail portions 263 are disposed on the base portions 260 adjacent the connector housing retention portions 261 and have a length sufficient to extend out from the connector housing base 213 in opposition with corresponding opposing holes 270 on a primary circuit board 272. The solder tail portions 263 will be commonly located between opposing ends of the connector and of standoffs 274 which may be formed along the bottom 213 of the connector housing 200 to space the connector a preselected distance away from the mounting surface 273 of the circuit board 272.

The terminals 250 are inserted from the bottom 213 of the connector housing 200 into the cavities 210 arranged along the connector base 213. In the bi-level connector shown in FIGS. 15 & 16A–B, the terminals are simultaneously inserted in their alternating array through openings 230 formed in the bottom 213 of the connector housing 200 that communicate with the terminal-receiving cavities 210, wherein the first and second terminals 254, 255 alternate lengthwise along the connector housing 200. As the terminals 250 enter the cavities 210, the contact portion spring arms 256, 257 may contact the inclined sides 208 of the housing base wall 207, forcing them slightly outwardly (toward the exterior of the connector housing 200 or the sidewalls 202, 204 thereof) to maintain their retention portions 261 in proper alignment with retention slots 234–236 formed in the cavity transverse walls 217 near or at the bottom 213 of the connector housing 200. Once inserted, the terminal spring arms 256, 257 extend in a cantilevered fashion from their intermediate and base portions 258 & 260 upwardly into the cavities 210.

As they are inserted into the cavities 210, the terminal preload wall engagement portions 251, 253 directly enter the second sections 225*b* of the cavities 210 near the top openings 214 of the connector. They enter the sections without intersecting the parting line 120 that defines the two sections 225*a*, 225*b*. Thus during insertion, the terminals 250 are not likely to encounter any flash that may occur along the parting line 120 during the molding of the connector housing 200.

FIGS. 16A & B illustrate the deflection of the terminals 250 upon insertion of a circuit card 400 into the card-receiving slot 206. FIG. 16A illustrates the rest, or unengaged position of the connector, while FIG. 16B illustrates the engaged position of the connector. It can be seen that when the circuit card 400 is inserted into the card slot 206 of the connector, the two terminal spring arms 254, 255 move outwardly toward the exterior portions 202*a*, 204*a* of the sidewalls 202, 204.

Figure 18:
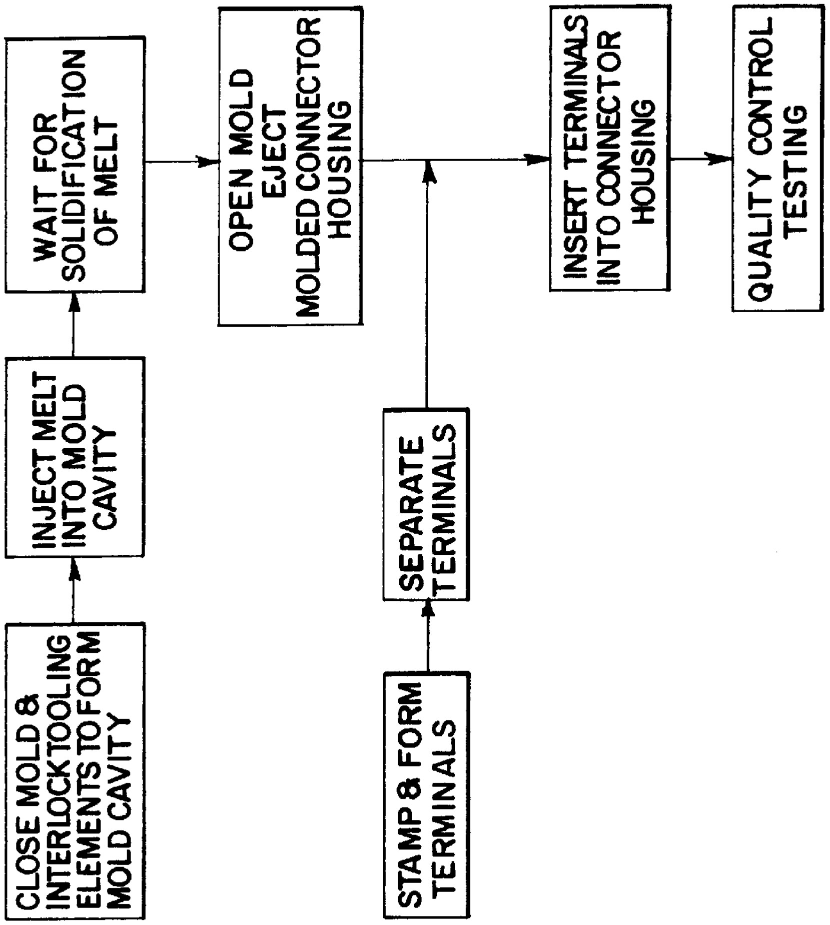
Figure 17:
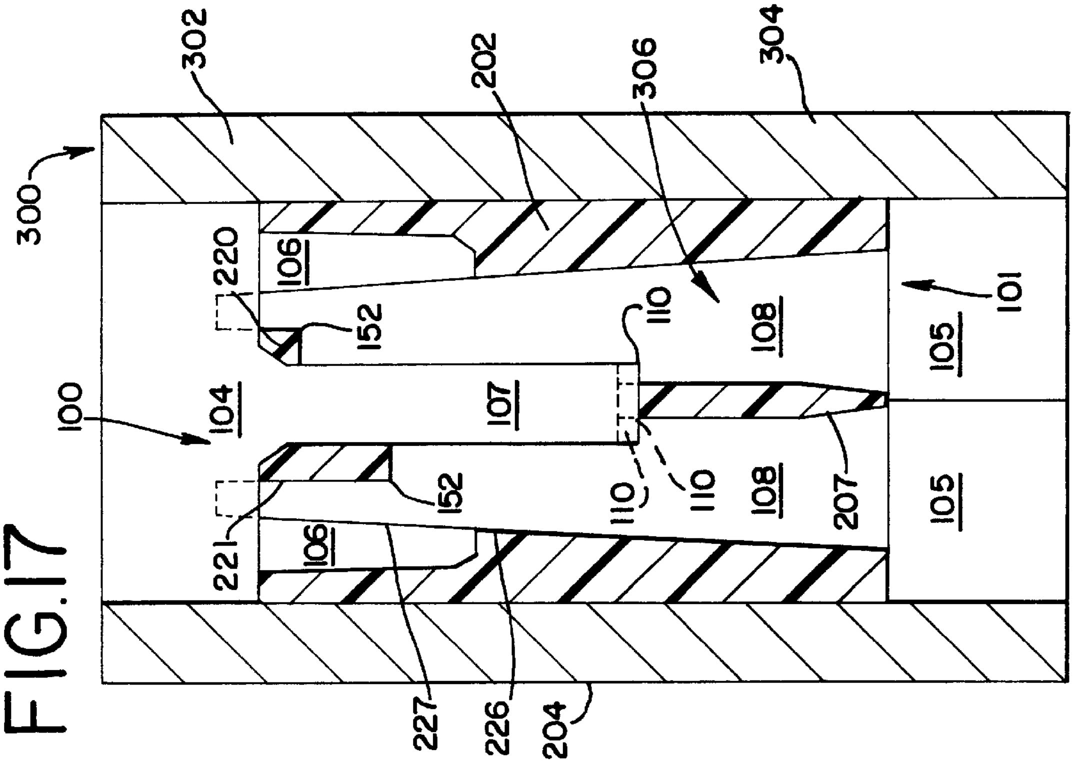
FIG. 17 is a sectional view of a mold with the laminated tooling assembly of FIG. 12 inserted therein; and, FIG. 18 is a schematic view of a method of manufacturing an edge card connector in accordance with the principles of the present invention.

A mold 300 is used in making the housing 200 of the connector shown in FIG. 17, and the mold 300 includes two mold halves 302, 304 that cooperatively define a mold cavity 306 therebetween which receives a core detail tooling assembly 150. The mold halves 302, 304 are brought together after the core detail tooling elements 100, 101 have been combined along their upper and lower interlocks 110 & 114 to form an assembly 150 inserted into the mold cavity 306. The interlocking tooling elements 100, 101 and the mold 300 cooperatively define a plurality of openings in the mold cavity 306 that correspond to the shape of the connector housing 200. Molten plastic is injected into the mold cavity so that it fills all of the openings therein to form portions of the connector housing 200, such as 202, 204, 207, 220 and 221 as illustrated in FIG. 16. The plastic is permitted to solidify, and the mold is broken apart and the connector housing ejected. Terminal assemblies 248 are stamped and formed, typically at another station, and are subsequently brought with the molded connector housings 200 to an insertion station as illustrated in FIG. 18 where they may be separated from their carrier strip and forced into the connector housing terminal-receiving cavities 210, such as by gang loading through the openings 230 formed in the bottom 213 of the connector housing 200. The finished connectors are then tested for quality.

It will be appreciated that the embodiments of the present invention which have been discussed are merely illustrative of some of the applications of this invention and that numerous modifications may be made by those skilled in the art without departing from the true spirit and scope of this invention.

We claim:

1. A method of molding electrical edge card connector housings, comprising the steps of:

providing a hollow mold;

providing a core detail tooling assembly insertable into said mold that cooperates with said mold to define a mold cavity having at least one opening that corresponds to the shape of a connector housing molded therein, the core detail tooling assembly including a plurality of pairs of interlocking first and second core detail tooling elements, each of said first and second core detail tooling elements of each said pair including vertical engagement surfaces disposed thereon such that the first core detail tooling element vertical engagement surfaces oppose the second core detail tooling element vertical engagement surfaces when said pairs of said first and second core detail tooling elements are interlocked together;

forming a mold cavity within said mold by: (a) interlocking respective said pairs of first and second core detail tooling elements together at upper and lower locations of said core detail tooling assembly such that said interlocking of said respective pairs of first and second core detail tooling elements at one of said upper and lower interlocking locations occurs within said mold, but exterior of said mold cavity opening, and (b) abuttingly engaging said first and second core detail tooling element opposing vertical engagement surfaces together within said mold cavity opening at locations adjacent at least one of said upper and lower locations of said core detail tooling assembly;

injecting a molten molding material into said mold cavity opening;

permitting said molten molding material to solidify in said mold cavity opening to form a molded connector housing; and, ejecting said molded connector housing from said mold.

2. The method of claim 1, wherein said step of interlocking said pairs of first and second core detail tooling elements together occurs within said mold, but exterior of said mold cavity opening occurs at said upper location, and said first and second core detail tooling elements each include respective base portions and detail portions extending therefrom.

3. The method of claim 2, further including the step of interlocking said pairs of said first and second core detail tooling elements together at said upper location by inserting ends of said second core detail tooling element detail portions into said first core detail tooling element base portions.

4. The method of claim 3, wherein said first core detail tooling element base portions include recesses formed therein that receive said second core detail tooling element detail portion ends.

5. The method of claim 4, wherein said first core detail tooling element detail portions include recesses formed therein and said second core detail tooling element base portions include projecting engagement ends that are received within said first core detail tooling element detail portion recesses in said step of interlocking said first and second core detail tooling elements at said lower interlocking location.

6. The method of claim 1, wherein said first core detail tooling element base portions are thicker than said second core detail tooling elements detail portions.

7. The method of claim 6, wherein said first core detail tooling element include three distinct detail portions extending from said base portions thereof and one of said first core detail tooling element detail portions is thicker than the other first core detail tooling element detail portions, said one first core detail tooling elements detail portion being approximately the same thickness as said first core detail tooling element base portion.

8. The method of claim 2, wherein said respective pairs of said first and second core detail tooling elements include respective detail portions of different thicknesses and cooperate when interlocked to define terminal-receiving cavities in said molded connector housing that have a stepped configuration.

9. The method of claim 8, further including the step of abuttingly engaging said respective pairs of said first and second core detail tooling elements along their respective opposing engagement surfaces, the engagement of said first and second core detail tooling elements forming generally vertical parting lines in terminal-receiving cavities of said connector housing molded therewith that extend through said connector housing terminal-receiving cavities without extending between opposing walls thereof.

10. The method of claim 1, further including the step of providing a notch in said first core detail tooling elements, the notch being spaced apart from said first core detail tooling element engagement surface.

11. In a molding core detail used for the molding of an electrical connector housing, the housing having an elongated body portion and two sidewalls that extend for a length of the connector housing, the housing sidewalls being separated by an intervening slot for receiving an edge of a circuit card therein and each of said housing sidewalls including a plurality of terminal-receiving cavities disposed therein in side-by-side order along the length of the housing, the molding core detail being insertable into a mold and cooperating with the mold to form a mold cavity having a plurality of openings that correspond in shape to said connector housing for molding of said connector housing by injecting a molten molding material into said mold cavity, said molding core detail including first and second opposing, interengaging core detail tooling elements, each of the first and second core detail tooling elements including at least one base portion and at least one detail portion extending from said base portion, the first core detail tooling element detail portions extending toward said second core detail tooling element base portions and the second core detail tooling element detail portions extending toward said first core detail tooling element base portions, the improvement comprising:

means for interlocking said first core detail tooling element detail portion together with said second core detail tooling element base portion in an area of said second core detail tooling element base portion that lies exterior of said openings of said mold cavity, said interlocking means including an engagement end disposed on said first core detail tooling element detail portion and a corresponding recess disposed on said second core detail tooling element base portion, said first core detail tooling element detail portion engagement end being received within said second core detail tooling element base portion recess, and said first and second core detail tooling elements further including opposing, almost vertical engagement surfaces formed on their respective detail portions, said first core detail tooling element detail portion engagement surface being disposed adjacent said first core detail tooling element detail portion engagement end and said second core detail tooling element detail portion engagement surface being disposed adjacent said second core detail tooling element base portion recess, whereby when said first and second core detail tooling element detail portion engagement surfaces engage each other when said first and second core detail tooling elements are interlocked, said first and second core detail tooling element detail portion engagement surfaces produce almost vertical parting lines in finished connector housings molded therewith.

12. The molding core detail as defined in claim 11, wherein said second core detail tooling element base portion has a thickness greater than a thickness of said first core detail tooling element detail portion.

13. The molding core detail as defined in claim 11, wherein each of said first and second core detail tooling elements include a plurality of first and second core detail members arranged in side-by-side order to form respective first and second core detail laminated tooling assemblies.

14. The molding core detail as defined in claim 11, wherein said first and second core detail tooling element detail portions cooperate to define said terminal-receiving cavities of finished housings molded therewith.

15. The molding core detail as defined in claim 11, wherein said first and second core detail tooling element detail portions are of different thicknesses and cooperate to form bifurcated terminal-receiving cavities in finished housings molded therewith.

16. The molding core detail as defined in claim 14, wherein said first core detail tooling element detail portions are thicker than said abutting second core detail tooling element detail portions, thereby producing a stepped configuration to portions of said bifurcated terminal-receiving cavities.

17. The molding core detail as defined in claim 12, wherein said first and second core detail tooling element detail portions cooperate to form irregularly-shaped terminal-receiving cavities in finished housings molded therewith.

18. The molding core detail as defined in claim 11, wherein said first core detail tooling element detail portions includes a notch formed therein that lies adjacent said second core detail tooling element detail portion and is spaced apart from said first and second core detail tooling element detail portion opposing engagement surfaces when said first and second core detail tooling elements are interlocked together.

* * * * *